July 30, 1946.  F. W. GODSEY, JR  2,404,954

AIRCRAFT POWER PLANT

Filed Feb. 2, 1943

WITNESS:
Leon M. Garman

INVENTOR
Frank W. Godsey, Jr.
BY O. B. Buchanan
ATTORNEY

Patented July 30, 1946

2,404,954

UNITED STATES PATENT OFFICE 2,404,954

AIRCRAFT POWER PLANT

Frank W. Godsey, Jr., Wilkinsburg, Pa., assignor to Westinghouse Electric Corporation, East Pittsburgh, Pa., a corporation of Pennsylvania Application February 2, 1943, Serial No. 474,475

4 Claims. (Cl. 60—35.5)

My invention relates to improvements in the jet type of propulsion-equipment for airplanes and other aircraft, in which air is drawn through a tube and discharged in a jet or blast at the rear of the aircraft.

A characteristic feature of my invention is the utilization of a high speed of rotation for the jet-propulsion equipment, which distinguishes my invention both from the conventional open-air propeller type of propulsion-equipment, and from previously known jet-propulsion equipments.

In accordance with my invention, a high-speed cylindrical or conical spinner is operated, on an axis extending fore and aft with respect to the aircraft, and carrying a relatively large number (more than 4) of stub-blades which operate within a tube which may be placed either in a power-unit nacelle of its own, or which may be completely submerged in the fuselage or in the air-foil section of a wing of an airplane. A characteristic feature of the invention is that the propeller operates at a speed well in excess of 6000 revolutions per minute, and preferably at a speed of the order of 15,000 revolutions per minute, or within the range between 10,000 and 20,000 revolutions per minute, or slightly more or less. The use of such a high speed is itself a means which contributes directly to the reduction in the weight per horsepower of the propeller, which is a consideration of paramount importance in aircraft, as it contributes directly to the operating-range, the speed, and the pay-load of the aircraft.

Figure 1:
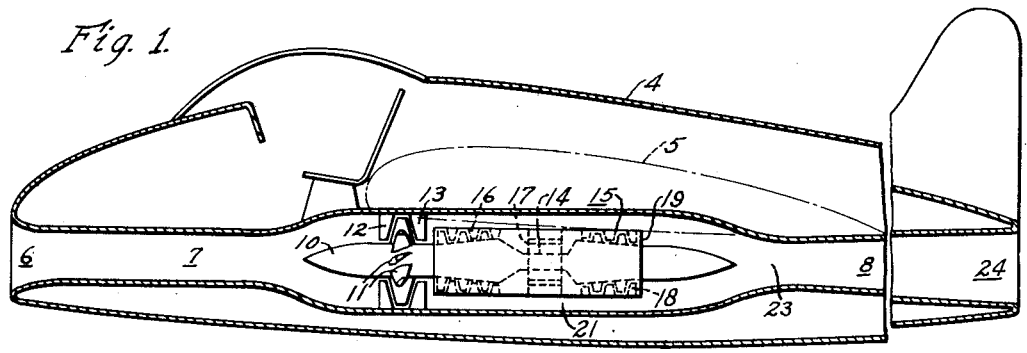
Figure 2:
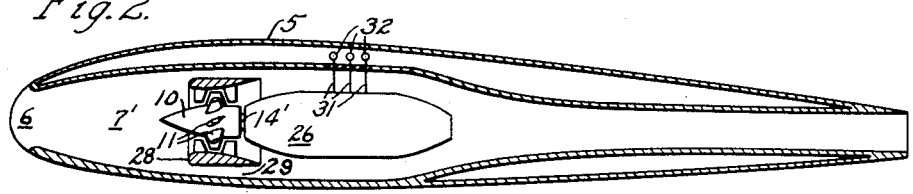

With the foregoing and other objects in view, my invention consists in the apparatus, combinations, structures, parts and methods hereinafter described and claimed, and illustrated in the accompanying drawing, wherein:

Figure 1 is a somewhat diagrammatic view illustrating the application of my invention in jet-propulsion equipment mounted in the fuselage of an airplane, utilizing the combination of a high-speed propeller and a direct-mounted gas turbine in a tunnel or tube, and Fig. 2 is a similar view of a wing-mounted propulsion-unit utilizing the combination of a high-speed propeller and a direct-connected high-speed electric motor within a tube or tunnel.

While my invention is adapted for mounting either in a nacelle of its own, or within the fuselage or airfoil wing-structure of an airplane, I have shown it, for the purpose of illustration, in Fig. 1, as being mounted within the fuselage 4 of an airplane, one of the wing-structures of which is indicated in dotted lines at 5. Air is drawn in, at the open front end 6 of the fuselage, and delivered through a tunnel or tube which is indicated at 7 and which runs substantially the entire length of the fuselage and discharges in an exhaust-jet 8 in the rear, the axis of the tube 7 being preferably approximately straight and approximately coincident with the direction of propulsion of the airplane. By "tube" I do not mean to imply either a circular cross-section or a uniform cross-section.

The air within the tube 7 passes first over a high-speed spinner 10 which is shown as being of conical or pointed shape, and carrying, at its large or rear end, a large number of stub propeller-blades 11, preferably considerably more than 4 blades being utilized, as illustrated. In some cases stationary inlet or outlet blading 12 or 13 may be utilized before or after the propeller-blading 11, for improving the efficiency of the propeller. It will be noted that the portion of the tube 7 which surrounds the propeller-blades 11 comes within close spacing with respect to the tips of the propeller-blades, thus effectively operating as a shroud for the blades.

Immediately behind the spinner 10, and mounted on the same shaft 14, is a gas turbine-unit 15 which is diagrammatically indicated, in Fig. 1, as comprising, from front to rear, first a compressor 16 for receiving some of the supercharged air delivered by the propeller 11, still further compressing it, and supplying it to a fuel-burner 17 and a turbine 18, from which the hot exhaust-gases are delivered from the open rear end 19 of the turbine-unit.

As shown in Fig. 1, some of the air discharged by the propeller 11 passes over and around the turbine-unit 15, in the annular space 21 between the turbine-unit and the tube 7, whereby such air is heated by the turbine, and cools the turbine, and partially shields the interior of the airplane from the heat of the turbine. The air-stream which discharges from the rear end of the annular space 21 mixes with the hot exhaust-gases discharging from the rear end 19 of the turbine-unit 15, and is finally discharged in a strong propulsion-jet 23 at the rear end of the tube 7.

I have not undertaken to illustrate details of the air-inlet 6 or the rear-end nozzle 24 for discharging the propulsion-jet 23, or the details of the gas-turbine unit 15, all of which is within the knowledge and skill of those skilled in the art. For the same reason, I have not undertaken to illustrate the exact construction and arrangement of the airplane, or the precise design of the tube 7 with respect to its structural mounting or sound-proofing or heat-insulation, as these features are not essential to my invention, except that any suitable provisions of this nature are to be made.

In accordance with my invention, the turbine-shaft 14, which is also the propeller-shaft, is rotated at a very high speed, of the order of 15,000 revolutions per minute, more or less, or at a top-speed which is at least in excess of 6,000 revolutions per minute, as previously stated, while the propeller-blades 11 are short and stubby, as propeller-blades go, but large in number, surrounding the periphery of the spinner 10. The combination of the high speed of operation with the stubby blade-construction results in a peripheral blade-tip speed which closely approximates the speed of sound, thus obtaining maximum propeller-efficiency. The presence of the tube or shrouding 7, surrounding the propeller-blades 11, makes it possible to obtain a relatively high efficiency of propulsion, without necessitating the large diameter of propeller which characterizes open-air propulsion-equipment.

In operation, air enters the open front end 6 of the tube 7, in Fig. 1, and is forced rearwardly by the propeller 11, the axis of the propeller-shaft 14 being approximately coincident with the direction of propulsion of the aircraft. Part of the compressed air discharged by the propeller 11 supplies the inlet of the compressor 16 of the gas turbine, while the remainder of the compressed air discharged by the propeller 11 flows between the tunnel-wall and the outer cylinder of the gas-turbine proper, thus cooling the turbine and heating the air-stream, resulting in an increase in the air-pressure of the air-stream. Finally, the hot exhaust-gas from the gas-turbine 18 mixes with the air-stream surrounding the turbine-unit 15, near the rear end of the tube 7, from which it discharges in a jet 23, the reaction of which produces a propelling force for the aircraft.

In order to be the most effective, in accordance with my invention, the propeller-blades 11 must have a relatively small diameter, probably not greatly exceeding 25 or 30 inches at 6,000 R. P. M., and smaller diameters at higher speeds. They must turn at a very high speed, higher than is obtainable with a direct-drive from a reciprocating engine. For this reason, if a reciprocating engine were utilized in place of the turbine 18 for driving the propeller 11, it would have to be utilized in combination with a speed-changing gearing (not shown), the essential thing being that the spinner 10 and the blades 11 must operate at the high speeds described, regardless of the details of the motive-means for driving the same at such speeds. The required high speed of operation of my propeller 11 is very well suited, however, to a direct-connected gas-turbine drive, as illustrated, because of the inherently high speed of operation of gas-turbines.

As illustrated in Fig. 2, my invention, in another form of embodiment, is further admirably suited to high-speed electric-motor drives, where the spinner 10, and propeller-blades 11, are direct-connected to the shaft 14' of a small-diameter high-speed electric motor 26, which may be a 500-cycle three-phase synchronous or induction motor, having four poles, and operating at approximately 15,000 revolutions per minute. Because of the high speed of operation of the motor 26, its overall diameter can be made very small, something of the order of twelve inches measured over the outside of the stator-structure, so that the entire assembly of propeller and motor, with its surrounding tube 7', may be placed within the air-foil section of a wing-structure 5, as shown in Fig. 2. This form of embodiment of my invention makes it possible to utilize high-speed motors, without reduction-gears, for driving a plurality of such propellers, in an electrical airplane-propulsion system of the general type described and claimed in an application of L. A. Kilgore, B. A. Rose, F. B. Powers and myself, Serial No. 474,474, filed February 2, 1943, assigned to the Westinghouse Electric Corporation.

As an optional feature shown in Fig. 2, I have shown an alternative form of design of apparatus, which may be utilized in any of the forms of embodiment of my invention, in which the propeller-blades 11 operate on only a portion of the inlet-air, being closely surrounded by a separate shroud-member 28, which is spaced from the walls of the tube 7' at this point, so that a portion of the inlet-air which enters the tube 7 at the front end 6 passes around the propeller, in the annular space between the shroud 28 and the tube 7'. The air discharged by the propeller-blades 11 carries along the remainder of the air which passes through the annular space 29, by induction on the exhaust-side of the shroud 28, thus permitting the propeller to operate at a very high velocity, or at high differential pressures, without encountering high jet propulsive losses.

It will be understood that the motor 26 is energized, through three-phase motor-leads 31, from an electric power-bus 32, which is intended to be symbolic or representative of any suitable high-frequency electric power-plant, having a frequency in excess of 200 cycles per second, and preferably in the range between 300 and 700 cycles, as described in the previously mentioned copending application of L. A. Kilgore et al. By the use of a high speed of operation, a high frequency, and a judicious use of unconventional materials for obtaining a minimum weight in the motor 26, it is possible to obtain a motor-design which not only has an extremely small weight, of the order of 0.3 or 0.4 pound per horsepower, but also an extremely compact design which can be readily merged within the air-foil section of even the thinnest of wings for the highest-speed airplanes. Since such a motor operates inherently at approximately the same high speed which is desired by the propeller-spinner 10 of my invention, it is possible to utilize such motors in a direct drive-connection, without the use of gearing.

While I have illustrated my invention in only two alternative forms of embodiment, I wish it to be understood that my invention is susceptible of a very considerable variation in its forms of embodiment and details of construction and operation. I desire, therefore, that the appended claims shall be accorded the broadest construction consistent with their language.

I claim as my invention:

1. Propulsion-apparatus for aircraft, comprising the combination, with the aircraft, of a high-speed motive-means having a rotor-axis extending in the approximate direction of propulsion of the aircraft, a coaxial spinner disposed in front of the motive-means and driven thereby at a top-speed in excess of 6,000 revolutions per minute, more than four stub-blades carried by the spinner for imparting a rearward axial velocity to the air, and a tube surrounding said spinner, said blades and said motive-means, a tubular shroud-portion closely surrounding the blades, said tube terminating in a rear-end nozzle-means, whereby a jet of air is drawn through the blades and over the motive-means and expelled to the rear.

2. Propulsion-apparatus for aircraft, comprising the combination, with the aircraft, of a high-speed motive-means having a rotor-axis extending in the approximate direction of propulsion of the aircraft, a coaxial spinner disposed in front of the motive-means and driven thereby at a top-speed in excess of 6,000 revolutions per minute, more than four stub-blades carried by the spinner for imparting a rearward axial velocity to the air, a tubular shroud surrounding said blades, and a tube surrounding said spinner, said shroud and said motive-means, said tube terminating in a rear-end nozzle-means, whereby a jet of air is drawn, partly through said blades, and partly between a space between said shroud and said tube, at least some of said air flowing over the motive-means, and the jet being expelled from the rear of the tube.

3. Propulsion-apparatus for aircraft, comprising the combination, with the aircraft, of a turbine-unit comprising a compressor, a fuel-burner, and a gas-turbine, and having a rotor-axis extending in the approximate direction of propulsion of the aircraft, a coaxial spinner disposed in front of the turbine-unit and having a direct-drive connection thereto, more than four stub-blades carried by the spinner for imparting a rearward axial velocity to the air, and a tube surrounding said spinner, said blades and said turbine-unit, with a space between the turbine-unit and the tube, a tubular shroud-portion closely surrounding the blades, said tube terminating in a rear-end nozzle-means, whereby a jet of air is drawn through the blades and delivered in a divided stream, part passing into the compressor of the turbine-unit and part passing over the turbine-unit, and rearwardly directed nozzle-opening means for discharging air and gases from the rear of said tube.

4. Propulsion-apparatus for aircraft, comprising the combination, with the aircraft, of a high-frequency electric motor having a rotor-axis extending in the approximate direction of propulsion of the aircraft, a coaxial spinner disposed in front of the motor and having a direct-drive connection thereto, means for supplying electrical energy to the motor at a frequency in excess of 200 cycles per second, more than four stub-blades carried by the spinner for imparting a rearward axial velocity to the air, and a tube surrounding said spinner, said blades and said motor, a tubular shroud-portion closely surrounding the blades, said tube terminating in a rear-end nozzle-means, whereby a jet of air is drawn through the blades and over the motor and expelled to the rear.

FRANK W. GODSEY, Jr.